Jan. 26, 1954     E. W. SEXTON     2,667,392
TABLE WITH DETACHABLE BOX
Filed July 8, 1950
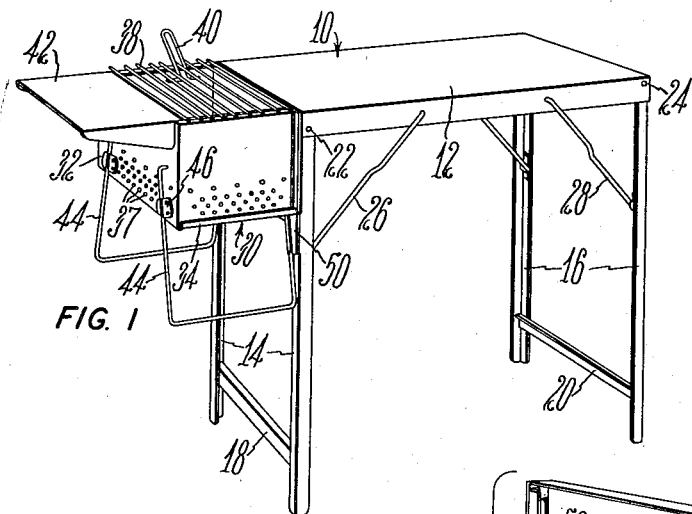
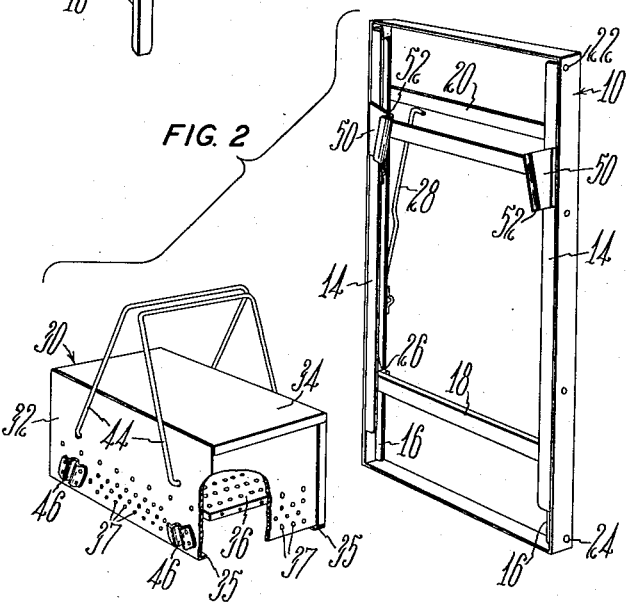
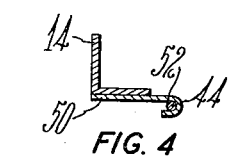
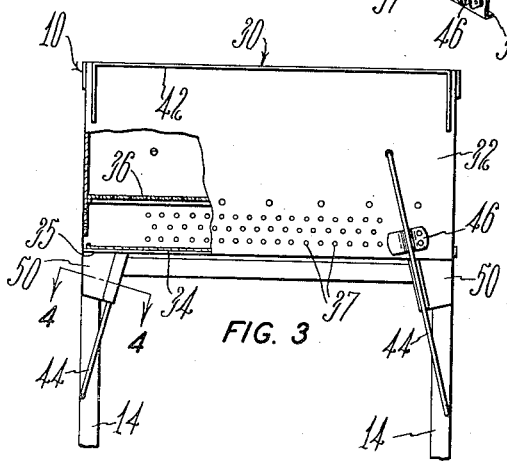
PROPRIETOR
EDWARD W. SEXTON
ATTYS Patented Jan. 26, 1954

2,667,392

UNITED STATES PATENT OFFICE 2,667,392

TABLE WITH DETACHABLE BOX

Edward W. Sexton, Cambridge, Mass., assignor to Sexton Can Company Incorporated, Everett, Mass., a corporation of Massachusetts Application July 8, 1950, Serial No. 172,677

1 Claim. (Cl. 311—103)

This invention relates to a combined folding table and brazier or grill for use in preparing outdoor meals and the like. An object of the invention is to provide a combined table and grill which are easily separable but have means whereby the grill can readily be supported at one end of the table so as to be flush with the top thereof. The grill preferably consists of a rectangular metal box having a grate within to support the fuel, a grid at the top of the box, a lid which can be used alternatively as the bottom or top cover of the box, and supporting means by which the grill can be supported above the ground on which the supporting means rests or by which the grill can be attached to the end of the table. Mounting the grill flush with the top of the table is a great convenience in permitting the use of the grill without the necessity of bending over. The grill is supported by a pair of wicket shaped bails which are pivotally secured to the sides of the metal box so as to be swingable to a downwardly extending position to serve as legs or supports either independently of the table or in combination therewith. The bails can also be swung to an upwardly extending position for use as a convenient handle by which the grill can readily be carried.

For a more complete understanding of the invention reference may be had to the following description thereof and to the drawing, of which—

Figure 1 is a perspective view of apparatus embodying the invention;

Figure 2 is a perspective view of the table and grill separated from each other and ready for transportation;

Figure 3 is an end elevation of the table and grill shown in Figure 1; and

Figure 4 is a section on the line 4—4 of Figure 3.

According to the present invention a table 10 is provided having a rectangular top 12 to which are pivotally attached a pair of legs 14 at one end and another pair of legs 16 at the other end. The legs on each of these pairs may be stiffened by cross bars 18 and 20 respectively. The legs 14 are pivoted to the top at 22 and the legs 16 are pivoted at 24. Suitable diagonal braces 26 and 28 are provided to hold the legs 14 and 16 in their operative position. These braces may be of any desired construction and are adapted to be easily released so that the legs 14 and 16 can be swung against the under side of the top 12 to fold the table as shown in Figure 2.

A brazier or grill 30 is provided and is so made as to be mountable at one end of the table as illustrated in Figure 1. This brazier preferably comprises a rectangular box 32 having an open top and bottom with a removable lid or cover 34 which can be placed on top of the box as illustrated in Figure 2 or can be supported on bottom flanges 35 to act as a bottom for the box. Within the box is mounted a perforated plate or grate 36 to support the fuel which is burned in the brazier. Vent holes 37 are provided in the side walls of the box below the level of the false bottom to admit air to support the combustion of the fuel on the grid when the lid 34 closes the bottom of the box. A top grid 38 is provided to be supported on the top of the box when the cover 34 has been removed. This top grid supports the food which is to be cooked on the brazier and may readily be removed when desired. For this purpose a simple tool 40 is shown in Figure 1 to facilitate removal when the top grid is hot. A removable shelf 42 may be hooked on to one side of the box 32 as shown in Figure 1. This shelf and the grid 38 may be stowed within the box when the brazier is not in use.

For supporting the brazier a pair of wicket shaped bails 44 are pivotally mounted on the brazier, the end portions of the bails projecting through the side walls of the box at points about half way between the top and bottom edges. These bails are preferably shaped in the form of angular U's and extend well beyond the top or bottom of the box so as to be swingable around the respective ends of the box, each bail having two parallel side portions connected by a transverse portion. The bails can thus occupy a downwardly extending position as illustrated in Figure 1 or an upwardly extending position as illustrated in Figure 2. When in the former position they preferably diverge downwardly and may be releasably held in place by catches 46 which are permanently secured to the side walls of the box, each catch being provided with a central channel or groove into which a portion of one of the bails snaps. Catches 46 are provided on both side walls of the box, only one of the side walls being illustrated on the drawing. When the bails 44 are in their downwardly extending position, they can act as legs to support the box in a position elevated a few inches above the ground. The bails can also be used to support the box against an end of the table 10. For this purpose, the legs 14 are each provided with a bracket 50. Each bracket may be made of a piece of heavy sheet metal of a casting having a groove 52 therein adapted to receive and be fitted by a portion of one of the bails 44. As shown in Figure 3, the brackets 50 are so shaped and attached to the legs 14 that the channels 52 diverge downwardly and face away from each other. Hence when the box 30 is placed against the end of the table with its bails 44 in their downwardly extending position, portions of these diverging bails enter the grooves 52 as the box is lowered and engage therein to support the box with its top flush with the table top as shown in Figure 1. In order to remove the brazier from the table, it is merely necessary to lift it slightly so as to disengage the bails 44 from the grooves 52.

As shown in Figure 2 the bails can be swung to an upwardly extending position wherein they serve as a convenient handle by which the brazier can readily be carried.

I claim:

In combination, a table having at one end thereof two brackets having channels facing away from each other and diverging downwardly, and a metal open-top box having two wicket-shaped bails pivotally attached to the sides of the box and swingable about respective ends of the box from an upwardly extending position for use as carrying handles to a downwardly extending and diverging position in which position portions of the bails are adapted to engage in said channels to support the box against said end of the table.

EDWARD W. SEXTON.

References Cited in the file of this patent

UNITED STATES PATENTS

| Number | Name | Date |
|---|---|---|
| 394,847 | French | Dec. 18, 1888 |
| 1,094,786 | Heath | Apr. 28, 1914 |
| 1,577,027 | Hobson | Mar. 16, 1926 |
| 1,582,346 | Oster | Apr. 27, 1926 |
| 1,706,886 | Kiler | Mar. 26, 1929 |
| 1,873,705 | Green | Aug. 23, 1932 |
| 2,148,439 | Crawford | Feb. 28, 1939 |
| 2,477,529 | Sprinkle | July 26, 1949 |
| 2,588,009 | Jones | Mar. 4, 1952 |

FOREIGN PATENTS

| Number | Country | Date |
|---|---|---|
| 620,438 | Great Britain | Mar. 24, 1949 |